United States Patent [19]

Lohberger et al.

[11] Patent Number: 5,096,507
[45] Date of Patent: Mar. 17, 1992

[54] METHOD OF APPLYING A CERIUM MISCH METAL COATING TO THE SURFACE OF A SPLINTER-ACTIVE COMPONENT OF AN INCENDIARY SPLINTER PROJECTILE

[75] Inventors: Claus Lohberger, Ainring; Willibald Kalcher, Bad Reichenhall; Fred Keller, Mitterfelden; Herbert Gärtner, Teisendorf; Günther Sandner, Schönau, all of Fed. Rep. of Germany

[73] Assignee: Buck Werke GmbH & Co., Fed. Rep. of Germany

[21] Appl. No.: 594,989

[22] Filed: Oct. 10, 1990

[30] Foreign Application Priority Data

Oct. 12, 1989 [DE] Fed. Rep. of Germany ....... 3934148

[51] Int. Cl.$^5$ .............................................. F42B 12/00
[52] U.S. Cl. ....................................... 148/13; 427/34; 427/37; 427/422
[58] Field of Search .......................... 148/13; 420/416; 427/422, 34, 37

[56] References Cited

U.S. PATENT DOCUMENTS

| | | | |
|---|---|---|---|
| 2,642,358 | 6/1953 | Kent et al. | 420/416 |
| 3,539,334 | 11/1970 | Goeddel et al. | 420/416 |
| 3,653,995 | 4/1972 | Selleck et al. | 75/354 |
| 3,894,867 | 7/1975 | Fishman et al. | 148/432 |
| 4,613,386 | 9/1986 | Yates et al. | 148/13 |

FOREIGN PATENT DOCUMENTS

| | | |
|---|---|---|
| 2059753 | 6/1972 | Fed. Rep. of Germany . |
| 3111725 | 10/1982 | Fed. Rep. of Germany . |
| 3245904 | 6/1984 | Fed. Rep. of Germany . |
| 3725091 | 2/1989 | Fed. Rep. of Germany . |
| 1342093 | 12/1973 | United Kingdom . |

*Primary Examiner*—Upendra Roy
*Attorney, Agent, or Firm*—Melvin I. Stoltz

[57] ABSTRACT

The present application describes a method of applying a firmly adhering cerium misch metal coating to the surface of a splinter-active component of an incendiary splinter projectile, namely to the outer lining and/or the inner lining of a steel projectile casing possibly pre-fragmented through structural weakening or to the surface of construction splinters of steel, hard metal or heavy metal, by using a splinter-active component containing as adhesion promoter for its basis metal and for the cerium misch metal at least one metal in the form of a matrix for the basic metal or as alloying component of the basic metal or in the form of an intermediate layer on the splinter-active component, the affinity of this metal to cerium misch metal being higher than the affinity of the basic metal of the splinter-active component, and by employing a low-pressure wire spraying method for the coating of the splinter-active component with molten cerium misch metal, said coated component being tempered in the usual manner after the solidification of the coating in order to additionally improve adhesion.

13 Claims, No Drawings

METHOD OF APPLYING A CERIUM MISCH METAL COATING TO THE SURFACE OF A SPLINTER-ACTIVE COMPONENT OF AN INCENDIARY SPLINTER PROJECTILE

TECHNICAL FIELD

The present invention relates to a method of applying a firmly adhering pyrophoric coating of cerium misch metal to the surface of a splinter-active component of an incendiary splinter projectile, this component consisting of steel, hard metal or heavy metal. This method includes the steps of coating the surface of the splinter-active component with molten cerium misch metal, solidifying the coating and tempering the coated component under inert gas atmosphere.

BACKGROUND ART

German publication DE-C 11 72 157 discloses an incendiary splinter projectile comprising a hollow inner container with a coating of pre-fabricated individual splinters thereon and an outer casing; these splinters are metallic bodies having on their surface a coating of a pyrophoric material, preferably of a possibly alloyed pyrophoric metal, the pyrophoric properties becoming effective upon impact on the target. These splinters (splinter-active components) are embedded in a synthetic resin composition. The pyrophoric metal coating on the surface of the splinter-active component (construction splinters) consisting of metal, such as steel, is preferably selected from the group consisting of aluminium, magnesium, zirconium, titanium and pyrophoric alloys made therefrom. This publication does however not contain any details about specific steps as to the application of the respective pyrophoric coating onto the surface of the splinter-active component. German publication DE-A 31 11 725 relates to a fuseless ring blade projectile. The tubular projectile body of this projectile has either along its outer lining or preferably along its inner lining breaking points caused by structural weakening. Such a pre-fragmentation of the projectile casing provides splinter-active components programmed as to size, shape and number. The necessary structural weakening of the projectile casing may be achieved e.g. through milling and lathing operations or through treatment with electron beams or ion beams. In its pre-fragmented range, the projectile casing thus provided with breaking points comprises a coating of a filler having a form sufficient stable to guarantee a smooth surface; it is advantageous if this coating consists of a material or a material composition having pyrophoric properties. If such a projectile casing (splinter-active component) is destroyed, there are formed fragments or splinters of the desired size, shape and number which do not only penetrate inflammable targets, such as fuel tanks, but also set them on fire on account of the pyrophoric surface coating. This publication does not contain any details as to the material or material composition having pyrophoric properties. Furthermore, this publication leaves completely open by which exact steps such a pyrophoric coating can be applied to the surface of the splinter-active component (tubular projectile body) of the respective ring blade projectile (incendiary splinter projectile).

The German publication DE-A 32 45 904 discloses a thin-walled tubular projectile having incendiary properties. A relatively thin coating of an easily castable and curable incendiary composition containing an organic binder is applied to the inner lining of the projectile casing. This publication and the German publication DE-A 31 11 725 already discussed before do not contain any details about the kind and the composition of the incendiary pyrophoric coating of this tubular projectile. However, the use of a castable and curable incendiary composition containing an organic binder means that the pyrophoric component is present in pulverant form, be it as one single material or as material composition. Consequently, one cannot conclude from this publication that there is a pyrophoric compact metallic coating along the inner lining of the casing of this tubular projectile even if the pulverulent pyrophoric component were based upon cerium misch metal.

The German publication DE-A 20 59 753 discloses incendiary splinter projectiles and other incendiary splinter weapons whose splinter-active components which are e.g. projectile casings made of steel, hard metal or heavy metal, casings or other weapons or other construction splinters have a pyrophoric coating of a compact metallic alloy having pyrophoric properties on their surfaces or on parts thereof, the major component of this coating being a rare earth metal. Preferably, this rare earth metal consists of cerium misch metal containing at least 45 wt.-% of cerium. Such an alloy may contain as additional metals e.g. iron, titanium, copper, beryllium antimony, tin, zinc, lead and aluminum in subordinate amounts in order to improve the disruptive strength of the pyrophoric coating. Furthermore, it is advantageous if the alloy on the basis of cerium misch metal also contains magnesium in an amount of less than 5 wt. %; this in order to prevent an oxidation and in order to improve the incendiary properties of the coating. Furthermore, the alloy on the basis of cerium misch metal is to contain preferably a relatively high amount of iron, e.g. 12.5 wt. %, in order to retard the burn-up speed of the coating in a controlled manner, and first of all to contain a certain minimum amount of carbon, e.g. of 0.035 to 0.085 wt.-% in order to improve the extensibility of the coating. The production of the alloy required for the preparation of a pyrophoric coating is, in the usual manner, effected by melting the components and subsequently solidifying the fused mass both in an inert atmosphere; in case of the intentional addition of carbon, the fused mass is annealed until the desired maximum carbon amount is obtained. The application of a pyrophoric coating consisting of such an alloy is effected e.g. by coating the either mechanically, through abrasives, or chemically, through etching agents, cleaned surface of the splinter-active component with a molten alloy, by solidifying the coating and possibly by tempering the coated component, these method steps being carried out in an inert gas atmosphere. By the possible tempering step, the adhesion of the pyrophoric coating to the surface of the splinter-active component is to be additionally improved through a so-called diffusion bond. In order to attain this effect, the coated component is held over a longer period of time in an inert gas atmosphere at a temperature lower than the melting temperature of the respective alloy and being suitably close to this temperature. Consequently, the tempering step will have to be carried out at a temperature allowing a diffusion of the metallic components of the neighbored surfaces without entailing the risk of a melting of the solidified coating.

In order to attain an additional improvement of the desired diffusion bond, this operation is suitably carried out under pressure by subjecting the composite body (splinter-active component) carrying the pyrophoric coating to a suitable pressure. Another possibility of applying a pyrophoric coating consisting of an alloy on the basis of cerium misch metal to the surface of the respective splinter-active component is to be seen in the feature that prefabricated compact bodies are used as coating which is applied to the surface of the respective splinter-active component only through diffusion bonding, this requiring practically absolutely the simultaneous employment of pressure in order to yield a sufficiently stable bond. Also such a method is again effected in an inert gas atmosphere. The afore-mentioned two methods involve however the disadvantage that the steps to be taken are very expensive, require high processing temperatures and do not yield uniform coatings. Furthermore, the coating with prefragmented splinter-active components entails the disadvantage that the recesses required for a fragmented destruction are completely occupied by the alloy applied in its molten state. In this way, the effect desired from a pre-fragmentation gets partially lost. A subsequent fragmentation of the coating is possible, however it is rather expensive. In the separate production of compact bodies of the pyrophoric coating one may provide for the desired prefragmentation through the use of corresponding molds, however, such pre-fabricated bodies may be applied to the surface of the respective splinter-active component only through diffusion bonding (or e.g. also through sticking). Therefore, the adhesion of the coating bodies onto the surface of the splinter-active component is insufficient.

The German publication DE-A 37 25 091 relates to an incendiary splinter projectile wherein the inner lining of the projectile casing is locally limitedly coated with an incendiary composition by leaving free lattice-structured spaces and wherein the explosive within the interior of the projectile casing extends also into the uncoated lattice-structured spaces. The lattice-structure is formed through placement of a curable and removable auxiliary material corresponding to the respective desired structure. This auxiliary material is suitably a specific matrix which can be applied to the inner lining and which can be removed afterwards; the spaces of this matrix are filled with the respective incendiary composition when the desired pyrophoric coating is applied. This incendiary composition may be any infiltratable incendiary composition which is preferably based upon an alloy of zirconium and titanium and is particularly a cerium misch metal. It is introduced according to a centrifugal casting process and is thus applied in its molten state as a coating to the inner lining of the projectile casing of the respective splinter projectile. By the employment of a matrix, it is possible to apply the pyrophoric coating to the inner lining of the casing of an incendiary splinter projectile by leaving free desired lattice-structured spaces which may also correspond to structural weakenings or pre-fragmentations of the projectile casing. The required specific matrix renders this method however rather expensive. The necessity of the application of the coating according to the centrifugal casting method involves in turn the disadvantage of a very compact pyrophoric coating e.g. of cerium misch metal whose ignition and through-reaction is not safeguarded when coming into use. Furthermore, this method does not allow a uniform coating having a smooth surface; consequently, a subsequent treatment, e.g. lathing treatment, of the coating obtained according to the centrifugal casting method might become necessary.

The known methods of applying a coating of cerium misch metal to the splinter component of an incendiary splinter projectile, and particularly the methods of applying the fused mass coating possibly with diffusion bonding of the coating through a tempering step involve the considerable disadvantage that the thus obtained adhesion of the coating to the surface of the respective splinter component is not sufficient in many cases. Due to the involved forces, the use of such incendiary splinter projectiles results therefore in a separation of the coating from the carrier, viz. from the splinter component; so the splinter component will be inactive and will no longer have an incendiary effect because the fragments of the coating alone do in general not have sufficient properties to break through the respective target. Furthermore, the known methods are relatively expensive, require in general high processing temperatures and do not allow the formation of a uniform coating following the configuration of the splinter component. Therefore, there are required subsequent treatments in order to obtain at least a smooth surface. The structural weakenings or recesses possibly provided at the carrier and required for a fragmented destruction of the respective splinter-active component are, according to most of the known methods, generally completely filled with pyrophoric material. Therefore, the effect of the pre-fragmentation is totally or at least partly cancelled unless this is prevented in advance by expensive additional measures or if no suitable subsequent treatment of the coating is effected.

It is therefore the object of the present invention to provide an improved method of applying a pyrophoric cerium misch metal coating to the surface of a splinter component of an incendiary splinter projectile and to overcome the afore-mentioned disadvantages of the known methods. Hence, the object of-this method is to provide a firmly adhering and easily ignitable coating which is not too expensive, which does not require high processing temperatures and which has a uniform thickness and a smooth surface, so that no subsequent treatments, especially also with respect to a restoration of the contours of the pre-fragmentation, will be necessary. The present method is to improve known methods wherein the respective coating of a fused mass of cerium misch metal is applied.

DETAILED DESCRIPTION

According to the method of the present invention, the objects of the present invention are realized by the features that (a) a splinter-active component is used which contains at least one metal as an adhesion promoter for the basis metal of this component and for the cerium misch metal either in the form of a matrix for the basis metal or as an alloying component of the basic metal or in the form of an intermediate layer on the surface of said splinter-active component, the affinity of this metal to cerium misch metal being higher than the affinity of the basic metal of the splinter-active component, and that (b) by employment of a low-pressure wire spraying method and by atomization of the molten cerium misch metal formed under the arc from two cerium misch metal wires or from a cerium misch metal wire and another metal wire which is not alloyable with cerium misch metal such a splinter-active component is coated by means of an inert gas stream supplied through an orifice and possibly under orientation of the atomized molten cerium misch metal by means of another inert gas stream directed to the splinter-active component to be coated through one or a plurality of orifices.

According to feature (a) of the method of the present invention, the use of a splinter-active component of steel, metal or heavy metal is essential, the basis metal of this component and the cerium misch metal containing an adhesion promoter whose activity with respect to cerium misch metal is higher than the activity of the basis metal of the splinter-active component. Basis metal is understood to be the metal which the splinter-active component is either entirely or substantially consisting of, which means that the basis metal contains an amount thereof of generally at least 70 wt.-%, preferably at least 80 wt.-% and particularly at least 90 wt.-%. Possibly, the basis metal may also be present in the form of a plurality of various metals which the splinter components are substantially made from and which are contained therein in bigger amounts; consequently, alloy components of subordinate quantity are not involved. In case of a splinter component of steel, the basic metal is iron. If the splinter-active component is based upon a hard metal, there may be involved cast hard alloys and sintered hard metals consisting of one or a plurality of metallic hard substances, such as tungsten carbide, titanium carbide and tantalum carbide, and of a binder selected from the iron group, such as cobalt, and being produced by casting, pressing or sintering. If the splinter-active component is based upon a heavy metal, the basis metal is in general chromium, molybdenum or tungsten, vanadium, niobium or tantalum, titanium, zirconium or hafnium or also cobalt or nickel, chromium and tungsten being the preferred metals.

The adhesion promoter for the basis metal may be present either in the form of a matrix for the basic metal in the splinter-active component or as alloy component of the basic metal in the splinter-active component or in the form of an intermediate layer on the surface of the splinter-active component; of course, combinations of these three forms are possible. Preferably, the adhesion promoter is present in the form of an intermediate layer on the surface of the splinter-active component, this intermediate layer being applied to the splinter-active component preferably through evaporation or particularly through electrolysis. Such an intermediate layer has a thickness of generally 5 μm to 50 μm, preferably of 10 μm to 30 μm, and especially of 15 μm to 20 μm.

Generally, the adhesive agents are metals selected from the group VIII in the form of cobalt or especially nickel, from group VIIA in the form of manganese, from the group IB in the form of silver or especially copper, or from d the group IIB in the form of cadmium or especially zinc of the periodic system of the elements. The especially preferred adhesion promoter is nickel, suitably in the form of an intermediate nickel layer on the surface of the splinter-active component. If the adhesion promoter is present in the form of a matrix for the basic material, it amounts generally to 5 to 30 wt.-%, preferably 8 to 15 wt.-%, and especially 10 to 12 wt.-%, related to the splinter-active component not yet having been coated. Here again, the matrix consists preferably of nickel; instead of nickel as the matrix, also ferronickel having a nickel content of approximately 20 to 30 wt.-% in the same weight percentage of pure nickel may be used.

If the adhesion promoter is present in the splinter-active component as an alloy component of the basic metal, its amount is generally 10 to 40 wt.-%, preferably 2o to 30 wt.-%, and particularly 22 to 27 wt.-%. In such case, nickel is again the alloy component which is the preferred adhesive agent.

According to feature (a) it is therefore an essential requirement of the method of the present invention that the splinter-active component to be used has, on account of suitable measures, a high affinity to cerium misch metal and thus to the cerium misch metal coating to be applied to the surface of the splinter-active component, so that the splinter-active component simultaneously has the function of an adhesion promoter for the pyrophoric cerium misch metal coating to be applied according to feature (b). Consequently, this affinity to cerium misch metal must be higher than the affinity of the basis metal or of the basis metal composition of the splinter-active component with respect to cerium misch metal. Therefore, a splinter-active component complying with these conditions is an essential feature of this invention so that the pyrophoric cerium misch metal coating to be applied to the surface of the respective component has good adhesion properties.

The second essential feature of the method of the present invention, namely feature (b), relates to the employment of a low-pressure wire spraying method for applying the pyrophoric cerium misch metal coating to the surface of the splinter component of the respective incendiary splinter projectile. According to this per se known low-pressure wire spraying method, a molten cerium misch metal is formed under the arc from two cerium misch metal wires or from a cerium misch metal wire and a metal wire which is not alloyable with cerium misch metal and which is preferably a tungsten wire, this cerium misch metal being finely atomized by means of an inert gas stream supplied through an orifice and applied to the splinter-active component to be coated. Also, there is required an orientation of the atomized molten cerium misch metal formed under the arc towards the surface of the splinter-active component to be coated. This orientation can either be effected by the inert gas stream which is also required for the atomization of the molten cerium misch metal or suitably by means of another inert gas stream supplied through one or a plurality of additional orifices. Consequently, the low-pressure wire spraying method according to feature (b) of the method of this invention is completely carried out in an inert atmosphere. This is first of all necessary because cerium misch metal easily reacts with oxygen, so more if it is present in the molten state and additionally in the atomized and thus fine-particulate molten state. The inert atmosphere required therefore can be created in any usual manner, e.g. by carrying out the method under vacuum. As an inert gas stream is already required for the atomization and orientation of the molten cerium misch metal formed under the arc and a principally and possible evacuation would require unnecessarily high expenses, the low-pressure wire spraying method is therefore entirely performed in an inert gas atmosphere and preferably in an argon atmosphere. The spray chamber required for the low-pressure wire spraying method and housing both the splinter-active component to be coated as well as the required spraying head is suitably evacuated before the method is started in order to remove air and oxygen contained therein and is then flooded by the respective inert gas, the inert gas atmosphere being maintained also during the entire course of the method. The very fine and free spray particles formed during the spraying method and not adhering to the workpiece or to parts of the spray chamber but being present therein in a loose or floating state may cause a dust explosion when the chamber is opened. In order to prevent this, these particles are deactivated after the spraying operation through the introduction of inert gas, preferably argon, containing up to 4 vol.-% of oxygen, preferably 2 to 3 vol.-% of oxygen.

The cerium misch metal wires required for the low-pressure wire spraying method to be employed according to the present invention have generally a diameter of approximately 2 to 3 mm and are available on coils. They contain normally 45 to 60 wt.-% of cerium, 15 to 30 wt.-% of lanthanum, 10 to 20 wt.-% of neodymium, 4 to 7 wt.-% of praseodymium and 1 to 2 wt.-% of samarium and 2 to 4 wt.-% of yttrium metals besides usual impurities which may be present in amounts of up to 1 wt.-%. Suitably, one uses cerium misch metal wires containing up to 6 wt.-% of lead, preferably 3 to 5 wt.-% of lead, and particularly approximately 4 wt.-% of lead as an alloy component. The lead present in the cerium misch metal wires to be used according to the present invention serves both as a flowing agent as well as for increasing the ductility of the cerium misch metal. This results in a facilitation of the spraying method and also in an improved cooling behavior of the atomized molten cerium misch metal when applied to the surface of the respective splinter-active component. Consequently, the method of the present invention prefers the use of lead-containing cerium misch metal wires, because this contributes also to an improvement of the adhesion of such a pyrophoric coating to the splinter-active component serving as carrier.

Furthermore, it is of advantageous if in the low-pressure wire spraying method cerium misch metal wires are used contain calcium in an amount of up to 6 wt.-%, preferably 3 to 5 wt.-%, and especially approximately 4 wt.-%, embedded in the form of fine wires. Possibly, instead of calcium or together with calcium also magnesium may be present also, the use of calcium being however preferred to the use of magnesium. Both magnesium as well as particularly calcium act as moderators when burning up the coating on the basis of cerium misch metal in using the splinter-active component of the respective incendiary splinter projectile. In this way, there is achieved an additional improvement of the ignitability of the cerium misch metal by reducing, on the one hand, the ignition temperature and by increasing, on the other hand, the sensitivity to friction. Consequently, there is achieved an optimal interaction of the heatstroke (temperature) occurring by the ignition of the explosive present in the respective incendiary splinter projectile and the friction (sensitivity to friction) caused by the breaking of the projectile casing or by the impact of the incendiary splinters onto the respective target. The presence of magnesium and especially of calcium in the cerium misch metal wires used in the low-pressure wire spraying method represents therefore a further preferred embodiment of the method of the present invention.

The use of cerium misch metal wires containing the indicated amounts of lead as an alloy component is especially preferred, however, lead may partly or completely be replaced by germanium or preferably tin, because all these metals act as moderators which partly segregate, viz. emerge from the surface of the alloy and thus form a protective coating when the molten alloy is cooled.

The thickness of the cerium misch metal coating to be applied according to the method of the invention to the surface of the respective splinter-active component is generally in response to the type and size of the respective splinter-active component. Generally, it is up to 6 mm, preferably 2 to 3 mm.

Prior to the application of the cerium misch metal coating, the surface of the respective splinter-active component is, of course, thoroughly cleaned in order to additionally improve the adhesion of the cerium misch metal coating. This cleaning step is effected mechanically through sandblasting and/or through application of chemical cleaning methods. Suitably, the surface to be coated should be roughened; this roughening is in case of an electrolytically applied intermediate layer on the, basis of the respective adhesive agent achieved through application of a high current intensity during the depositing method.

After the application of a firmly adhering pyrophoric cerium misch metal coating onto the surface of the respective splinter-active component, the obtained composite body is suitably tempered for a period of time which is in response to the size and shape of the respective splinter-active component and maintained at an increased temperature in order to additionally increase the adhesive properties. This tempering step may e.g. last between approximately 20 minutes and some hours and is generally carried out at a temperature of 500 to 700° C., preferably approximately 600° C. Also this tempering step is carried out again in an inert atmosphere, e.g. in an inert gas stream, especially in an argon stream.

Possibly, the applied coating may additionally be subjected to a special surface smoothing treatment, e.g. through blasting with glass balls, viz. with spherical smooth glass balls having a diameter of e.g. less than 0.1 mm. Suitably, again an inert atmosphere is employed.

According to a final measure, the applied pyrophoric coating is provided in addition to an anticorrosive layer in order to prevent or, in any case, to substantially prevent an oxidation of the reactive cerium misch metal prior to the use of the respective incendiary splinter projectile. Various neutral substances, such as rubber fluoride, cold zinc, silicone resin, polyethylene or polyurethane, are suitable for such protective layers. The application of such protective layers may be effected in the usual manner.

The low-pressure wire spraying method to be employed according to the present invention is carried out with wires having a thickness of 2 to 3 mm at a direct current of 25 to 40 volt and at a current intensity of 20 to 80 ampere. Suitably, a direct current of approx. 30 to 35 volt and a current viscosity of 40 to 60 ampere are applied. If wires of another thickness are used, the electric capacity will have to be adapted accordingly.

In order to achieve an optimal adhesion of the atomized cerium misch metal coating formed under the arc onto the surface of the respective splinter-active component, it is recommended that during the execution of this low-pressure wire spraying method the splinter-active component is, through heating, maintained at an increased temperature which is in general 150° C. to 650° C., preferably 200° C. to 500° C., and especially 250° C. to 400° C., in order to prevent where non correspondingly tempered surface of the splinter-active component to be coated too quick a quenching of the atomized molten cerium misch metal results in a worse or even insufficient adhesion. The necessary heating at least of the surface of the splinter-active component to be coated may be carried out in any suitable manner, such as by direct or indirect heating of this component; such an indirect heating may e.g. also be carried out by the required inert gas and by the inert gas stream supplied for the atomization and orientation of the molten cerium misch metal.

By the application of the low-pressure wire spraying method according to the present invention, a coating of a very fine-pored structure of individual small cerium misch metal balls is formed on the surface of the splinter-active component. As compared to the compact structure of a coating consisting of a usual melt and being subsequently cooled, such a coating valves a considerably improved ignition behaviour entailing a totally improved reaction and a complete through-reaction, so that the incendiary energy becoming effective at the target is higher than in the case of known compact splinters. In case of the especially preferred combination of an intermediate nickel layer between the surface of the splinter-active component and the cerium misch metal coating thereon there is involved an additional incendiary and burning effect caused by the very high alloy in heat.

The splinter-active component may quite generally be any projectile envelope pre-fragmented by structural weaking of the outer lining and/or preferably of the inner lining, this projectile envelope for an incendiary splinter projectile being first of all made of steel and being along its outer lining and/or preferably along its inner lining provided with the cerium misch metal coating. Therefore, the formation of splinters on destruction of the respective projectile envelope is so to speak programmed by a pre-fragmentation, so that due to such breaking points substantially only construction splinters of desired size, shape and amount are formed. The measures to be taken in order to achieve such a structural weaking are known to those skilled in the art and include e.g. the steps of milling, lathing or treatment with electron beams or ion beams. However, the splinter-active component may also directly consist of construction splinters of steel, hard metal or heavy metal for an incendiary splinter projectile, these splinters carrying on their surface the respective cerium misch metal coating. In such case, the splinter-active component is normally provided on the outer lining or on the inner lining of the envelope of the respective projectile or preferably in the interior of the projectile envelope, so that it is brought to the target through destruction of the respective incendiary splinter projectile. Then, construction splinters on the basis of tungsten are especially preferred.

The method of the present invention is first of all characterized by the features that it provides for an especially firmly adhering pyrophoric cerium misch metal coating on the respective splinter-active component of an incendiary splinter projectile, that it is not especially expensive, that it does not require high processing temperatures and that it results in a uniform coating entailing due to its specific structure a well-balanced easy ignitability and a good through-reaction, so that the obtained splinter-active components have an extremely high incendiary effect. First of all, the method of the present invention allows to provide also structured and pre-fragmented splinter-active components with a totally substantially uniformly thick cerium misch metal coating, so that the normally required after-treatment in order to restore the pre-fragmentation provided on the splinter-active component will become superfluous. By replacing the so far required coating of the surface of the splinter-active component directly by a molten cerium misch metal, first of all splinter-active components having contoured surfaces and/or hard to reach surfaces can uniformly be coated, e.g. the inner linings of various projectile envelopes; in addition, the very expensive necessity of having to subsequently treat such inner coatings to an extent in response to the pre-fragmentations present on the projectile envelopes will be superfluous.

The method of the present invention is carried out with a modified low-pressure wire spraying device of OSU GmbH, 4620 Castrop-Rauxel, Federal Republic of Germany. This device is using a direct current of 25 to 40 volt and a current intensity of 20 to 80 ampere; an increased current intensity up to 120 ampere is also possible. According to the preferred embodiment, the spraying compound consists of two parallel cerium misch metal wires containing an alloying component 4 wt.-% of lead and 4 wt.-% of calcium embedded in the form of fine wires. The wires are continuously supplied by a motor to the spraying head (spraying nozzle) in the spraying chamber in order to atomize the molten cerium misch metal formed under the arc and to be sprayed onto the splinter-active component to be coated. The employed inert gas stream is an argon stream preferably containing three vol.-% of oxygen in order to prevent dust explosions caused by the presence of small spray particles.

The spraying chamber has a tightly closing cover and can be evacuated so that prior to the respective spraying operation air (oxygen) contained therein can be withdrawn before the spraying chamber is flooded with argon being the protective gas.

The spraying head can be reciprocated in the interior of the spraying chamber by a usual control means, the possible advance movement of the maximally possible length of the spraying head corresponding to the splinter-active component to be coated. Apart from its reciprocability, the spraying head cannot make any other rotating movement within the spraying chamber, so that in any case at least during operation no rotating movement is possible. Consequently, the spraying head can, under program control only be moved in axial direction.

In the spraying chamber, axially opposite to the spraying head there is provided a three-jaw chuck connected to a motor through a shaft, either a projectile envelope to be provided along its inner lining with the desired pyrophoric cerium misch metal coating or a drum housing the splinter-active component to be coated in the form of construction splinters, such as balls of steel, hard metal or heavy metal and being maintained during the coating step in a tumbler movement caused by rotation of the drum being clamped between said three-jaw chuck. The splinter-active component to be coated, be it in the form of a projectile envelope or in the form of construction splinters disposed in a drum, is consequently only under control maintained at a rotational movement during the wire spraying method and is not additionally reciprocated.

Instead of a reciprocation of the spraying head, of course also a fixed position of the spraying head is possible; however, the three-jaw chuck driven by a shaft and clamping therebetween either the projectile envelope to be coated or the drum containing the construction splinters to be coated will then not only have to be maintained under program control at a rotational movement but simultaneously also under program control at a reciprocating movement.

The supply pipe housing all supply elements and organs for the spraying head is, of course, like the shaft carrying the chuck for the components to be coated gas-tightly disposed in the side walls of the spraying chamber.

During the spraying step, the three-jaw chuck and thus the splinter-active component clamped therebetween and to be coated are rotated at the respectively desired speed and the spraying head is reciprocated in accordance with the length of the component to be coated at an also controlled speed until a cerium misch metal of the desired thickness is obtained. During this step, the component to be coated is suitably heated. During the spraying step, an arc develops between the cerium misch metal wires, so that the continuously advanced wires are molten. The melting charge of cerium misch metal is divided into fine drops by an argon stream coming from the atomizing nozzle and is blown through an angular pressure nozzle onto the splinter-active component to be coated.

After the coating step, the spraying chamber is opened and the coated splinter-active component is removed, and delivered to a usual tempering device which is maintained during the tempering step also under an inert gas atmosphere, preferably an argon atmosphere.

Finally, the coated and tempered splinter-active component is coated in a usual manner with an anti-corrosive coating.

Instead of cerium misch metal, the method of the present invention may also use other usual pyrophoric alloys on the basis of cerium misch metal; however, these alloys usually contain at least 50 wt.-% of cerium misch metal, the rest being usual and also pyrophoric metallic alloying components. Such pyrophoric alloys on the basis of cerium misch metal are known in various compositions and can be seen in the relevant literature. Reference is e.g. made only to the German publication DE-A 20 59 753 already mentioned before.

What is claimed is:

1. A method for applying a firmly adhering pyrophoric coating of cerium misch metal to the surface of a splinter-active component of an incendiary splinter projectile, this component consisting of steel, hard metal or heavy metal, comprising the steps of
   A. coating the surface of the splinter-active component with molten cerium misch metal, said splinter-active component comprising at least one metal as an adhesion promoter for the basic metal of this component and for the cerium misch metal either in the form of a matrix for the basic metal or as alloying component of the basic metal or in the form of an intermediate layer on the surface of said splinter-active component, the affinity of this metal to cerium misch metal being higher than the affinity of the basic metal of said splinter-active component;
   B. employing a low-pressure wire spraying method in said coating step and by atomizing the molten cerium misch metal formed under the arc from two cerium misch metal wires, or from a cerium misch metal wire and another metal wire which is not alloyable with cerium misch metal, said splinter-active component being coated by means of a first inert gas stream supplied through an orifice;
   C. solidifying the coating under an inert gaseous atmosphere; and
   D. tempering the coated component under inert gaseous atmosphere.

2. The method defined in claim 1, wherein the adhesion promoters are further defined as comprising metal selected from group VIII, comprising cobalt or nickel, from the group VIIA, comprising manganese, from group IB, comprising silver or copper, or from group IIB, comprising cadmium or zinc.

3. The method defined in claim 1 wherein the adhesion promoter is further defined as comprising nickel.

4. The method defined in claim 1 wherein said adhesion promoter is further defined as being in the form of a matrix for the basic metal in an amount of 5 to 30 wt. %, preferably of 8 to 15 wt. %, or as an alloy component of the basic metal in an amount of 10 to 40 wt. %, preferably of 20 to 30 wt. %, or in the form of an intermediate layer applied to the surface of the splinter-active component, this intermediate layer having a thickness of from 5 um to 50 um, preferably of from 10 um to 30 um.

5. The method defined in claim 1, wherein said adhesion promoter is further defined as being present on the surface of the splinter-active component in the form of an intermediate nickel layer preferably applied through evaporation or through electrolysis.

6. The method defined in claim 1, wherein the cerium misch metal wires are further defined as containing an alloying component up to 6 wt. % of lead, preferably 3 to 5 wt. % of lead.

7. The method defined in claim 1, wherein the cerium misch metal wires are further defined as containing calcium in an amount of up to 6 wt. %, preferably 3 to 5 wt. %, embedded in the form of fine wires.

8. The method defined in claim 1, wherein said inert gas atmosphere is further defined as comprising an argon atmosphere.

9. The method defined in claim 1, wherein said low-pressure wire spraying method is carried out with the use of wires having a thickness of approximately 2 to 3 mm at a direct current of 25 to 40 volts and at a current intensity of 20 to 80 amperes.

10. The method defined in claim 1, wherein said splinter-active component is further defined as comprising a steel projectile casing for an incendiary splinter projectile, this projectile casing being pre-fragmented through structural weakening along the outer lining and/or along the inner lining and being provided along said outer lining and/or preferably along said inner lining with a coating of cerium misch metal.

11. The method defined in claim 1, wherein said splinter-active component comprises construction splinters of steel, hard metal or heavy metal for an incendiary splinter projectile, the surface of these construction splinters being provided with a cerium misch metal coating.

12. The method defined in claim 1, comprising the additional step of
   E. orienting the atomized molten cerium in such metal on the surface of the splinter-active component by directing a second inert gas stream towards the splinter-active component being coated, said second inert gas stream flowing through one or a plurality of orifices.

13. The method defined in claim 1, wherein each of the steps are repeated at least one additional time in order to increase the thickness of the cerium misch metal coating.

* * * * *